United States Patent
Cho

(10) Patent No.: US 9,439,065 B2
(45) Date of Patent: Sep. 6, 2016

(54) ASSOCIATION OF AN IDENTIFICATION STORED IN A MOBILE TERMINAL WITH A LOCATION

(71) Applicant: Bayerische Motoren Werke Aktiengesellschaft, Munich (DE)

(72) Inventor: Young-Jae Cho, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/587,243

(22) Filed: Dec. 31, 2014

(65) Prior Publication Data

US 2015/0111542 A1 Apr. 23, 2015

Related U.S. Application Data

(63) Continuation of application No. PCT/EP2013/063764, filed on Jul. 1, 2013.

(30) Foreign Application Priority Data

Jul. 5, 2012 (DE) .......................... 10 2012 211 731

(51) Int. Cl.
*H04W 8/20* (2009.01)
*H04M 1/725* (2006.01)
(Continued)

(52) U.S. Cl.
CPC ........... *H04W 8/20* (2013.01); *H04M 1/72572* (2013.01); *H04W 4/027* (2013.01); *H04W 12/06* (2013.01); *H04W 4/021* (2013.01)

(58) Field of Classification Search
CPC ..... H04W 8/20; H04W 4/027; H04W 12/06; H04W 4/021; H04M 1/72572; B60N 2/0248; B60N 2/0244; B60N 2/0232; B60N 2/0252; B60Q 2300/112
See application file for complete search history.

(56) References Cited

U.S. PATENT DOCUMENTS

| | | | |
|---|---|---|---|
| 2008/0085689 A1* | 4/2008 | Zellner | H04M 1/6075 455/187.1 |
| 2011/0137520 A1* | 6/2011 | Rector | H04M 1/72577 701/36 |

(Continued)

FOREIGN PATENT DOCUMENTS

| | | | |
|---|---|---|---|
| DE | 100 09 057 A1 | 8/2001 | |
| DE | 10009057 A1 * | 8/2001 | ............. B60R 25/04 |

(Continued)

OTHER PUBLICATIONS

International Search Report dated Oct. 29, 2013 (Two (2) pages).

(Continued)

*Primary Examiner* — Mehmood B Khan
(74) *Attorney, Agent, or Firm* — Crowell & Moring LLP

(57) ABSTRACT

A method for associating an identification stored in a mobile terminal with a location, particularly a seat, includes receiving a piece of information indicating a first time at which a previously unoccupied location is occupied by a person, the occupancy of the location being acquired by a sensor associated with the location. A piece of information indicating a second time at which the movement of the mobile terminal is received which implies that, if the mobile terminal were carried along by a person, the person carrying the terminal would occupy a location, the movement being acquired by a sensor in the mobile terminal. A relationship is determined between the first time and the second time. Therefore, the identification is received and associated with the determined location.

19 Claims, 1 Drawing Sheet

(51) Int. Cl.
*H04W 4/02* (2009.01)
*H04W 12/06* (2009.01)

(56) References Cited

U.S. PATENT DOCUMENTS

2011/0298924 A1* 12/2011 Miller ................. H04M 1/6075
348/148
2013/0324051 A1* 12/2013 Magarida ............... H04B 17/00
455/67.12

FOREIGN PATENT DOCUMENTS

DE    10 2009 016 878 A1    10/2010
DE    10 2010 002 861 A1    9/2011
DE    102010002861    *    9/2011    ............. B60R 21/15

OTHER PUBLICATIONS

German Search Report dated Mar. 1, 2013, with Statement of Relevancy (Five (5) pages).

* cited by examiner

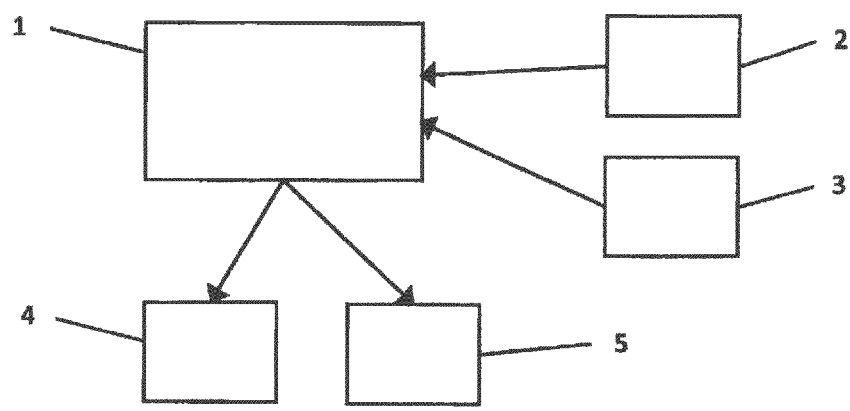

ASSOCIATION OF AN IDENTIFICATION STORED IN A MOBILE TERMINAL WITH A LOCATION

CROSS REFERENCE TO RELATED APPLICATIONS

This application is a continuation of PCT International Application No. PCT/EP2013/063764, filed Jul. 1, 2013, which claims priority under 35 U.S.C. §119 from German Patent Application No. 10 2012 211 731.8, filed Jul. 5, 2012, the entire disclosures of which are herein expressly incorporated by reference.

BACKGROUND AND SUMMARY OF THE INVENTION

The invention relates to a method for associating an identification stored in a mobile terminal with a location, particularly a seat, and a device set up for this purpose.

Nowadays, no identification of the driver or the passengers takes place in a passenger car as the driver or passengers are entering the car. At most, a remote key of the passenger car contains an identification, and for this identification, passenger car adjustments, such as the seat height, are stored in the passenger car. During the entering of the passenger car, the identification of the remote key is received from the passenger car, and the adjustments for the passenger car are correspondingly taken over; for example, the seat height is adjusted. However, the identification is limited to the respective remote key. When the key is used by several persons, the same stored adjustments will nevertheless always be taken over.

At the same time, co-called smartphones are widespread nowadays and are often used and carried along by only one person.

It is an object of the invention to provide an improved identification of a person who occupies a seat or, more generally, a location.

The method according to one embodiment of the invention for associating an identification stored in a mobile terminal with a location, particularly a seat, includes receiving a piece of information indicating a first time at which a previously unoccupied location is occupied by a person, the occupancy of the location being acquired by means of a sensor associated with the location; receiving a piece of information indicating a second time at which the movement of the mobile terminal implies that, if the mobile terminal were carried along by a person, the person carrying the terminal would occupy a location, the movement being acquired by means of a sensor in the mobile terminal; determining a relationship between the first time and the second time; receiving the identification; and associating the identification with the determined location.

In the process, a connection is thereby established between the occupancy of a location and the movement of a mobile terminal. Mobile terminals are typically carried along by the user and therefore at least partially carry out the user's movement. This fact is used for determining when a user is occupying a location. It is detected when a movement of the mobile terminal indicates that a person carrying the mobile terminal occupies a location. Simultaneously, it is detected by way of a sensor which location is occupied. By comparing the time sequence, in other words, the correlation, the occupancy of the location and the movement of the mobile terminal, a mobile terminal or its identification can be associated with a location. In other words, it is determined whether the occupancy of the location essentially takes place at the same moment as the movement of the mobile terminal indicating an occupancy. Since a specific mobile terminal is usually carried by the same person, the identification of the person occupying a location is improved.

It is a further advantage of the method that the location with which the identification is associated can be precisely determined by means of the sensor acquiring the occupancy of the location. In a situation, in which the location is one of several locations, it can thereby the determined which location is taken up or occupied by the mobile terminal. Thus, it is conceivable, for example, that a different identification can in each case be associated with different occupied seats in a passenger car. Personalized contents, services or functions can then be offered to the respective identification or the respective person. The latter takes place while taking into account that a driver's attention should be diverted as little as possible from the traffic situation. Likewise, contents can be exchanged between the persons, and the user interfaces can be adapted to the respective persons. It is conceivable to simplify a log-in process, particularly in the case of changing drivers or occupants of a passenger car.

In the case of several mobile terminals, it is conceivable to determine a connection between the respective first and second time only for a number of mobile terminals that is lower by one than the total number. The remaining terminal can then be associated with the remaining occupied location.

The process is preferably implemented by an electronic arithmetic unit of a vehicle, particularly of a passenger car.

The association of the identification can be used for offering personalized services to the person occupying the location or, for example, for taking over adjustments stored for this person or identification, such as adapting the seat position.

The mobile terminal may be taken along by being carried in a trouser pocket, a coat pocket, or a handbag or by being held in a person's hand, or the like. A movement of the mobile terminal that indicates that a user has occupied a location may be an occurring stopping after having moved, or a stopping with a preceding loss of height when occupying a seat.

In each case, points of time or time periods may be associated with the first and the second time. The relationship between the first and the second time may consist of the fact that the amount of the difference between the point of time assigned to the first time and the point of time associated with the second time is less than a threshold value; or that the time period associated with the first time and the time period associated with the second time overlap one another, or are separated by a time period that is less than a threshold value.

When a relationship is to be determined for several terminals and several occupied locations, the determination of the relationship between individual terminals and locations can also be carried out based on a minimizing of the amounts (or squares) of the differences between the respective first and second times.

The sensor acquiring the occupancy of the location and associated with the location may be a pressure-sensitive sensor, a capacitive sensor, a camera with a corresponding image processing or, particularly in the case of a seat, a seat occupancy mat. The sensor may also be equipped for acquiring an only short-term non-occupancy, for example, in the case of persons taking turns with respect to the occupancy.

The reception of a piece of information may be the receiving by way of a wired or wireless connection, or the receiving or retrieving of a result provided by a program or a function within a program run.

A mobile terminal may comprise a mobile telephone, a so-called smartphone or a so-called key fob. The mobile telephone may comprise acceleration and/or rotation rate sensors, transmission devices, particularly for the wireless transmission of sensor data or processing results, an electronic arithmetic unit, a stored identification, authentication characteristics and/or devices for the implementation of a program. The mobile terminal may be equipped for transmitting the identification and/or authentication characteristics by means of the transmission devices. In particular, the mobile terminal may be equipped for acquiring the time of a movement of the mobile terminal, which implies that a person carrying the mobile terminal has taken up a location, particularly has occupied a seat, and for transmitting this time. As an alternative, the mobile terminal may be equipped for acquiring the movement of the mobile terminal and transmitting this movement.

A previously unoccupied location comprises a location which, before the occupancy by the person, had not been occupied for a long time but also a location which had only been unoccupied for a short time, for example, when the occupancy changes from one person to another.

The identification, which is stored in the mobile terminal, may be an identification associated with the hardware of the terminal, an identification which is associated with the operating system or a program of the terminal, or an identification which is inputted by the user carrying it along or by the person carrying it along.

In a further development, the process comprises the receiving of signals which indicate the occupancy of the location and, as required, the location itself, based on signals from the sensor which acquires the occupancy of the location, and the determining of the first time based on the signals. In other words, in this further development, the process also comprises the acquisition or determination as to at which time the location becomes occupied, based on the signals of the sensor. The acquired or determined time will be used again in the further process.

In another further development, the process comprises the receiving of signals which indicate the movement of the mobile terminal, based on signals from the sensor which acquires the movement of the mobile terminal; and the determining of a second time based on the signals. In other words, in this further development, the process also comprises the acquisition or determination of the time at which the movement of the mobile terminal indicates that a location was taken up, based on the signals of the sensor. The acquired or determined time will be used again in the further process. The determination of the second time may be a function of an occupancy type of the location. The occupancy type of the location may be to remain standing if the location is occupied by a standing at this location, or to sit down if the location, for example, a seat, is occupied by a sitting-down. The type of occupancy may be preset or automatically defined or received. Determining the second time may comprise the acquisition of a stoppage of the mobile terminal after a preceding movement or the acquisition of a stoppage of the mobile terminal after a preceding loss of height, In a preferred further development of the invention, the method comprises the receiving of authentication characteristics from the mobile terminal. These authentication characteristics may be a user number and a password and/or so-called credentials. Nowadays, infotainment systems, which offer personalized services, are installed in modern passenger cars. In order to be able to utilize these personalized services, it is, however, necessary for a user to register in these systems by means of a user name and password. This is an uncomfortable procedure, which may be perceived to be time-consuming, particularly because the input possibilities are often limited in passenger cars, compared with a typical personal computer or laptop. By means of the preferred further development of the method, a user carrying the mobile terminal can authenticate himself without separately having to input his authentication characteristics. This process may further comprise the providing of personalized data at the location based on the authentication characteristics. Personalized services are therefore offered to the user at his location.

In a variant, the method comprises the prompting of the adjustment of the seat corresponding to an adjustment stored for the mobile terminal, particularly the seat height and the backrest inclination respectively. In this manner, the adjustment of a seat is adapted to a user's known needs.

Other objects, advantages and novel features of the present invention will become apparent from the following detailed description of one or more preferred embodiments when considered in conjunction with the accompanying drawings.

BRIEF DESCRIPTION OF THE DRAWINGS

In the following, a preferred embodiment of the invention will be described by means of the attached drawing.

FIG. 1 illustrates a construction and the interaction of individual elements of an embodiment of the invention.

DETAILED DESCRIPTION OF THE DRAWINGS

The electronic processing unit 1, which has computing capacity and is equipped with a Bluetooth communication module, is disposed in a passenger car. Furthermore, the electronic processing unit 1 is electronically coupled with the seat occupancy mat and receives signals from the latter as to whether the seat comprising the seat occupancy mat is occupied. It is known to the electronic processing unit 1 which seat of the passenger car comprises the seat occupancy mat.

The smartphone 2 has an electronic arithmetic unit, movement sensors, stored identifications and credentials, thus, for example, a combination of user name and password and a Bluetooth communication module. During the operation, the smartphone 2 is coupled with the electronic processing unit by means of a Bluetooth connection, so that data can be exchanged. Simultaneously, the smartphone 2 implements a program, also called an app, which analyzes sensor data from the acceleration sensors as to whether the smartphone carries out a movement, which implies that the person carrying the smartphone has taken a seat. As soon as this has been detected, the smartphone will send the time, at which this movement was acquired, to the electronic processing unit 1 together with the identification and the stored credentials.

The processing unit 1 simultaneously processes the sensor data received from the seat occupancy mat 3, in order to acquire the time at which the seat comprising the seat occupancy mat 3 is being occupied.

When now a person carrying the smartphone occupies the seat comprising the seat occupancy mat, the processing unit 1 will receive the time, which the smartphone has acquired as a result of the movement, and acquires the time at which the seat becomes occupied on the basis of the sensor data of the seat occupancy mat. The processing unit 1 determines the difference between the first and the second time. If this difference is lower than a threshold value, for example, 1 second, the identification and the received credentials of the smartphone are assigned to the seat comprising the seat occupancy mat.

Subsequently, the seat adjustment 4 is instructed by the processing unit 1 to implement the adjustment of the seat associated with the identification and/or the credentials, for example, by a corresponding instructing of actuators.

Furthermore, the identification and/or the credentials and the assigned seat are reported to an infotainment module 5 by the processing unit 1. The infotainment module 5 now makes it possible to retrieve personalized contents, such as an address book or incoming email, on display and operating elements which are associated with the seat.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for identifying an occupant of a location, the method comprising the acts of:
    receiving a first time data from an occupancy sensor associated with the location, the first time data indicating a first time at which the location becomes occupied;
    receiving a second time data from a mobile device associated with a user, the second time data indicating a second time at which a motion sensor of the mobile device senses a movement of the mobile device that implies occupancy of the location by the user;
    determining from the first time data and the second time data whether a correlation exists between the occupancy sensor sensing the occupancy of the location and the motion sensor sensing the movement;
    receiving an identification data of the user from the mobile device if the correlation is determined to exist; and
    associating the user as the occupant of the location using the identification data.

2. The method according to claim 1, wherein the location is a seat in a motor vehicle.

3. The method according to claim 1, further comprising the act of receiving authentication data from the mobile device.

4. The method according to claim 3, further comprising the act of associating access rights with the location based on the received authentication data.

5. The method according to claim 2, further comprising the act of prompting of the adjustment of the seat corresponding to an adjustment stored for the mobile device.

6. A location occupancy determining device, comprising:
    a wireless transceiver communicatively coupled to a mobile device of a user;
    an occupancy sensor configured to sense when a location becomes occupied and to generate a first time data based thereon;
    an electronic control unit configured to:
        receive the first time data from the occupancy sensor;
        receive a second time data from the mobile device, via the wireless transceiver, the second time data indicating when a motion sensor of the mobile device senses a movement of the mobile device that implies occupancy of the location by the user;
        determine from the first time data and the second time data whether a correlation exists between the occupancy sensor sensing the occupancy of the location and the motion sensor sensing the movement;
        receive an identification data of the user from the mobile device if the correlation is determined to exist; and
        associate the user as occupying the location via the identification data.

7. A method for personalizing a driving experience, the method comprising:
    receiving a first time data from an occupancy sensor associated with a passenger vehicle seat, the first time data indicating a first time at which the seat becomes occupied;
    receiving a second time data from a mobile device associated with a user, the second time data indicating a second time at which a motion sensor of the mobile device senses a seating movement of the mobile device;
    determining from the first time data and the second time data whether a correlation exists between the occupancy sensor sensing the seat is occupied and the motion sensor sensing the seating movement;
    receiving an identification data of the user from the mobile device if the correlation is determined to exist;
    associating the user as the occupant of the seat via the identification data; and
    adjusting one or more parameters of the passenger vehicle based on the association.

8. The method of claim 7, further comprising the step of receiving authentication data from the mobile device.

9. The method of claim 8, wherein the step of adjusting includes associating access rights to a vehicle feature with the seat based on the received authentication data.

10. The method of claim 7, wherein the step of adjusting includes adjustments according to stored parameters associated with the user.

11. The method of claim 7, wherein the adjusted parameters include seat position, including one or more of: height, depth and inclination.

12. The method of claim 7, wherein the seating movement comprises at least one of: a prolonged stop after a decrease in elevation.

13. The device of claim 6, wherein the location is a seat in a motor vehicle.

14. The device of claim 13, wherein the electronic control unit is further configured to adjust one or more parameters of the passenger vehicle based on the association.

15. The device of claim 14, wherein the electronic control unit is further configured to:
    receive authentication data from the mobile device, and
    associate access rights to a vehicle feature with the seat based on the received authentication data.

16. The device of claim 6, wherein the electronic control unit is further configured to receive authentication data from the mobile device.

17. The device of claim 14, wherein the adjustments are according to stored parameters associated with the user.

18. The device of claim 14, wherein the adjusted parameters include seat position, including one or more of: height, depth and inclination.

19. The device of claim 6, wherein the seating movement comprises a prolonged stop after a decrease in elevation.

* * * * *